Figure 1:
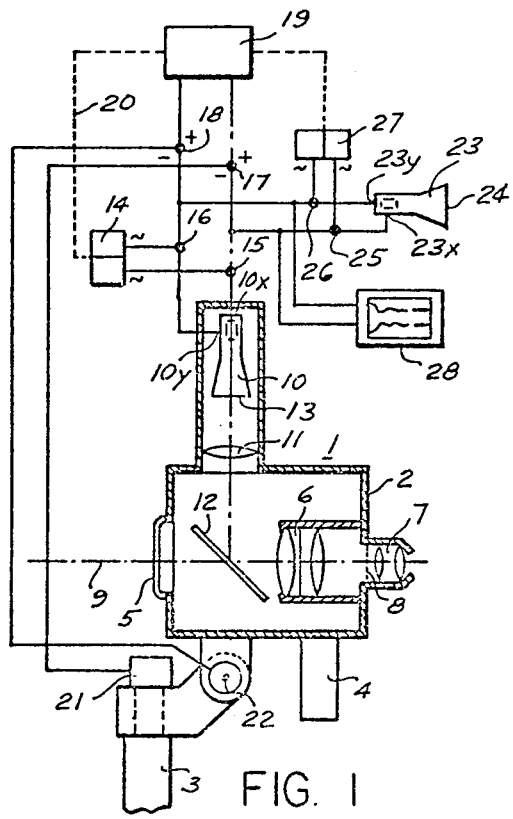

United States Patent
Borjeson

[15] 3,691,284
[45] Sept. 12, 1972

[54] TARGET SIMULATOR FOR AN OPTICAL SIGHT

[72] Inventor: Jan Lennart Borjeson, Karlskoga, Sweden

[73] Assignee: Aktiebolaget Bofors, Bofors, Sweden

[22] Filed: Feb. 26, 1971

[21] Appl. No.: 119,329

[30] Foreign Application Priority Data

March 6, 1970   Sweden ............... 3048/70

[52] U.S. Cl. ............ 35/10.2, 35/25, 178/DIG. 21, 235/61.5 S, 318/649
[51] Int. Cl. ............ G09b 9/00, F41g 3/26
[58] Field of Search ...... 235/61.5 S, 150.27; 35/10.2, 35/25; 178/DIG. 21, DIG. 33; 318/640, 648, 649, 591, 582

[56] References Cited

UNITED STATES PATENTS

| | | |
|---|---|---|
| 3,594,556 | 7/1971 | Edwards............. 235/150.27 |
| 3,566,026 | 2/1971 | Bonebreak et al..178/DIG. 21 |
| 3,443,476 | 5/1969 | Heider et al............. 318/649 |
| 3,629,959 | 12/1971 | Colin et al. ................ 35/25 |

*Primary Examiner*—Felix D. Gruber
*Attorney*—Hane, Baxley & Spiecens

[57] ABSTRACT

The invention relates to a target simulator for optical aiming sights for simulating a moving target for the training of personnel in the use of the sight. The simulator device produces electronically a luminous dot, circle or ellipse, which appears within the field of view of the aiming sight and moves therein against the terrain or sky background in exactly the same manner as a real target and which can be tracked by operation of the aiming sight in exactly the same manner as when tracking a real target. A training instructor can continuously supervise the performances of the pupil when catching and tracking the simulated target and furthermore the tracking error can be automatically recorded for later analysis. The simulated target symbol can be moved within the field of view of the sight so as to duplicate practically any arbitrarilly selected movements of a real target.

6 Claims, 3 Drawing Figures

PATENTED SEP 12 1972

3,691,284

TARGET SIMULATOR FOR AN OPTICAL SIGHT

The present invention is related to a simulator device for optical sights for simulating a moving target for training purposes.

The combat efficiency of a weapon system including a manually operated aiming sight is to a very great extent dependent on the speed and accuracy with which the operator of the aiming sight can catch and track the target to be fired at. The training program for sight operators must therefore include target tracking practices. In order to obtain the desired result of the training, these target tracking practices must be as realistic as possible, which means that they must be carried out under ambient conditions and with target movements which correspond as closely as possible to those that may be expected in actual combat. Of course, the most realistic target tracking practices are obtained with the use of actual targets. The costs for such target tracking practices are however very large, in particular when the target is an aircraft, wherefore such target tracking practices can be used only to a very limited extent. Therefore, for target tracking practices one uses often models or dummies of real targets which are moved along lines, rails or similar systems. However, such training arrangements are comparatively expensive and require large spaces, wherefore they can only be erected as stationary installations in a comparatively limited number. For aircraft targets such training installations must for practical reasons generally be erected indoors in large training halls. Consequently, these installations do not permit really realistic target tracking practices under the varying ambient conditions with respect to terrain and weather that may exist in actual combat. Further, they permit only a comparatively limited number of different courses for the target model. Also in this respect target tracking practices with such a plant will be unrealistic. An additional serious disadvantage in conventional target tracking practices, with real targets as well as target models, is that the training instructor has no possibility to observe and criticize the performance of the pupil continuously, as he cannot with any larger degree of certainty judge the speed and accuracy with which the pupil catches the target and subsequently tracks it with the aiming sight.

The object of the present invention is therefore to provide a simulator device for optical aiming sights for simulating a moving target for training purposes, which simulator makes it possible to carry out realistic target tracking practices outdoors in the field without the use of real targets or target models and which makes it possible for the instructor to check and record the efficiency of the pupil continuously.

The simulator device according to the invention comprises a cathode ray tube with a display screen, means for generating on said display screen a luminous, generally spot-shaped target simulating symbol and deflecting means for moving said target symbol relative to a center of the display screen as a function of signals supplied to said deflecting means; course generating means for generating a signal varying in a predetermined manner, which signal is supplied to said deflecting means, whereby said target symbol is moved over the display screen of said cathode ray tube in a predetermined manner corresponding to a predetermined course for the target to be simulated; means for reflecting an image of the display screen of said cathode ray tube into the field of view of the aiming sight so that the center of the display screen coincides with the line of sight of the aiming sight, and means responsive to the movements of said line of sight relative to a coordinate system fixed in space for producing a signal representing said movements, said signal being supplied to said deflecting means of said cathode ray tube as an additional control signal therefore in such a way that any movement of the line of sight relative to space causes a corresponding but oppositely directed displacement of the target symbol on the display screen relative to the center of the display screen.

A simulator device according to the invention requires only that the aiming sight as such is supplemented with a comparatively small number of additional components as compared to a corresponding sight for combat use, wherefore the dimensions and the weight of the training sight will differ very little from the dimensions and the weight of the combat sight. All other parts of the simulator device can be arranged in a unit separate from the sight, which unit can be positioned on the ground or in a vehicle beside the sight and be connected thereto through an electric cable. Consequently, the training sight and the simulator device according to the invention can be moved and used in the field in the same way as a real combat sight, wherefore target tracking practices can be carried out under varying ambient conditions in a very realistic manner. Further, the simulator device does not in any way affect the operation of the sight during the target catching and tracking process, wherefore the sight operator can act in exactly the same manner as when using a real sight in actual combat. Further, the sight operator will in the field of view of the aiming sight see the surrounding terrain on the sky background, respectively, in exactly the same manner as during a target tracking operation with a real combat sight. The only difference will be that instead of a real target he will see a luminous spot or ellipse which moves within the field of view against the terrain or sky background in exactly the same manner as a real target. Any displacement or movement of the line of sight of the aiming sight initiated by the sight operator during the target tracking operation will consequently cause exactly the same change of the terrain or sky background, respectively, seen in the field of view of the sight as when using a real combat sight and also an exactly corresponding and fully realistic displacement of the line of sight relative to the luminous target symbol. Further, the training instructor can continuously observe and check the efficiency of the target tracking operation of the pupil and also record it for later analysis. Finally, in a simulator device according to the invention it is possible to provide practically arbitrarily varying courses and speeds for the simulated target.

Figure 2:
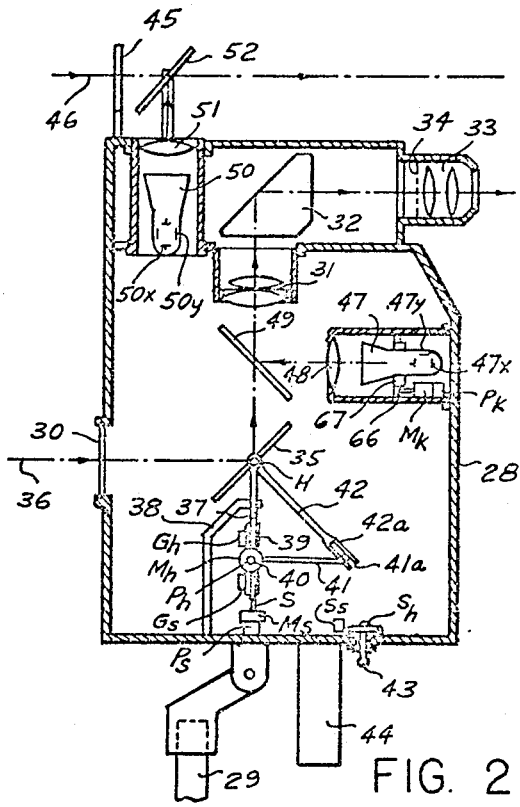
Figure 3:
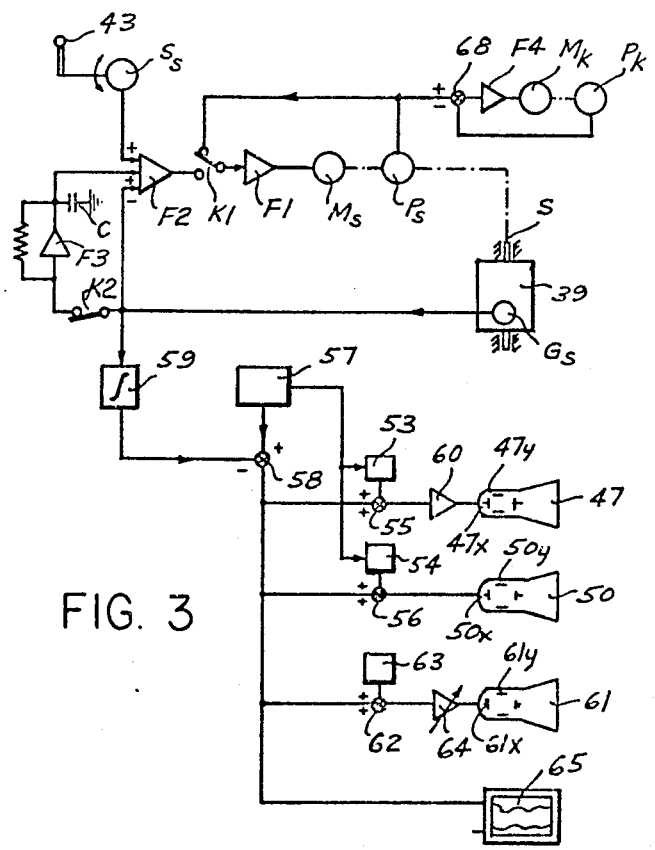

In the following the invention will be further described with reference to the enclosed drawing, in which FIG. 1 shows by way of example and schematically a simple optical sight provided with a simulator device according to the invention;

FIG. 2 shows schematically and by way of example a more sophisticated aiming sight having a gyrostabilized and servo-controlled line of sight, provided with a simulator device according to the invention; and FIG. 3 is a block diagram of the electric circuits for the sight and associated simulator device shown in FIG. 2.

FIG. 1 shows only very schematically a simple optical aiming sight generally designated with 1. The sight comprises a sight casing 2, which is mounted on a schematically indicated stand 3 so as to be rotateable in elevation as well as azimuth. On its lower side the side casing 2 is provided with a handle 4 for the operator. In the front wall of the sight casing a viewing window or sight opening 5 is provided. The sight casing encloses a telescope optics, which is fixed in the sight and in conventional manner includes an objective 6 and an eye piece 7. In front of the eye piece 7 a hairline cross or a similar device 8 is mounted, by means of which the sight operator can estimate the deviation between the line of sight 9 of the aiming sight and the target viewed through the sight.

In the above described respects the aiming sight 1 corresponds completely to a conventional simple optical aiming sight of a type that can be used for tracking a moving target and for the aiming of a weapon to be fired at the target. For the sake of simplicity any means for determining the direction of the line of sight 9 and thus the direction to the target and for transferring this information to a weapon associated with the sight have been omitted. It is also appreciated that such means can be omitted in a sight to be used only for target tracking practices, unless the target tracking practices are to be combined with the firing of practice projectiles.

The simulator device according to the invention comprises a cathode ray tube 10 mounted in or on the sight casing 2. By means of a simple collimator optics 11 and an oblique semi-translucent mirror 12 mounted in front of the telescope objective 6 the display screen 13 of the cathode ray tube 10 is reflected into the telescope optics, i.e. into the field of view of the sight. Consequently, the sight operator can see the section of the terrain or sky, respectively, which lies within the field of view of the sight and at the same time also the display screen 13 of the cathode ray tube 10. As the display screen 13 of the cathode ray tube is dark, however, this will not be seen as such by the sight operator, who will only see the luminous spot produced by the electron beam on the display screen 13 as if it were located at a substantial distance in the terrain or in the space within the field of view of the sight.

As conventional the cathode ray tube 10 is provided with a deflecting system including deflecting plates $10x$ for the deflection of the electron beam in the X-direction over the display screen 13 and deflection plates $10y$ for the deflection of the electron beam in the Y-direction over the display screen 13. Through the optics 11 and the semi-translucent mirror 12 the display screen 13 of the cathode ray tube is reflected into the optics of the sight in such a way that the center of the display screen coincides with the line of sight 9, whereas the X-direction and the Y-direction on the screen 13 coincide with the horizontal direction and the vertical direction, respectively, in the field of view of the sight. The luminous spot produced by the electron beam on the display screen 13 of the cathode ray tube is consequently reflected into the field of view of the sight and is used as a target symbol. In order that the luminous target symbol on the display screen 13 of the cathode ray tube 10, which is used for simulating a real target, shall not be a dot but have a certain extension, a symbol generator 14 which produces two sinusoidal alternating voltages of controllably variable amplitude, which are 90° out of phase to each other and which are connected to the deflection plates $10x$ and $10y$, respectively, of the cathode ray tube 10 through signal adding circuits 15 and 16, respectively. In this way a circular or elliptical luminous symbol is produced on the display screen 13 in a manner well known in the art. The size of this symbol is dependent on the amplitude of the alternating voltages produced by the symbol generator 14.

The target symbol produced on the screen of the cathode ray tube 10 in the manner described above is caused to move over the display screen and thus within the field of view that the sight operator has through the sight in a predetermined manner corresponding to the movements of a real target moving in a predetermined course with a predetermined speed. This is achieved by means of deflection voltages which are applied to the deflection plates $10x$ and $10y$, respectively, of the cathode ray tube 10 through the signal adding circuits 15 and 16 and additional signal adding circuits 17 and 18, respectively, from a target course generator 19. This target course generator may be a function generator. Fundamentally it consists of two direct voltage generators, which two direct voltages, which vary after a predetermined program and represent the angular movements in azimuth and elevation respectively of a target moving with a predetermined speed in a predetermined course. By variation of the program after which the direct voltages generated by the target course generator 19 vary, it is possible to change the speed and/or the course of the simulated target to a practically unlimited extent. Consequently, the luminous target symbol seen by the sight operator in the field of view of the sight will move relative to the line of sight as well as the terrain or sky background in exactly the same manner as a real target. In order to obtain that the size of the target symbol will vary in a realistic manner in accordance with the distance of the simulated target from the sight, the symbol generator 14 may preferably be controlled from the target course generator 19, as indicated by a dotted line 20, in such a manner that the amplitude of the voltages from the symbol generator 14 and thus the size of the circular or elliptical symbol on the screen 13 of the cathode ray tube 10 increases as the simulated target moves closer to the sight.

During the target tracking practice the sight operator shall consequently, by rotation of the sight casing 2 in azimuth and/or elevation, aim the line of sight 9 towards the target symbol, which is reflected into the field of view of the sight and which moves in the same manner as a real target, and thereafter maintain the line of sight 9 on the target symbol as accurately as possible. The movements of the line of sight 9 caused by the sight operator are sensed by two signal generators 21 and 22 which are coupled to the azimuth axis and the elevation axis respectively of the sight and which produce direct voltage signals representing the angular movements of the line of sight 9 in azimuth and elevation, respectively. The signals from the signal generators 21 and 22 are supplied through the signal adding circuits 17 and 18, respectively, to the deflection plates 10x and 10y, respectively, of the cathode ray tubes 10 with such polarities that any movement of the line of sight 9 relative to the ambient space causes a corresponding but exactly opposite displacement of the target symbol on the screen 13 of the cathode ray tube. Consequently, any change of the direction of the line of sight 9 will cause an exactly opposite change in the relative positions of the line of sight 9 and the movable target symbol in a manner which is very realistic to the sight operator. It is appreciated that as a consequence hereof the deviation between the target symbol and the line of sight will always represent the error in the target tracking process.

The simulator device comprises preferably an additional cathode ray tube 23, fundamentally of the same type as the cathode ray tube 10, provided with a display screen 24, deflection plates 23x for deflecting the electrone beam in the X-direction over the screen 24 and deflection plates 23y for deflecting the electrode beam in the Y-direction over the screen 24 and a symbol generator 27 of the same type as the symbol generator 14 connected to these deflection plates through signal adding circuits 25 and 26, respectively. The deflection plates 23x and 23y in this additional cathode ray tube 23 are through the signal adding circuits 25 and 26, respectively, supplied with exactly the same deflection voltages from the signal adding circuits 17 and 18 as the deflection plates in the cathode ray tube 10. Consequently, the luminous symbol on the screen 24 of the cathode ray tube 23 will move relative to the center of the screen exactly in the same way as the target symbol on the display screen 13 of the cathode ray tube 10. The cathode ray tube 23 is arranged so that its display screen can be watched by a training instructor, who on this cathode ray tube can continuously supervise the target tracking operation carried out by the pupil.

Further, the simulator device may preferably include signal recording means 28, for instance a graphic recorder or a digital typing recorder, to which the signals from the signal adding circuits 17 and 18 are also supplied and which records the amplitude of these signals as a function of time. As said signals represent the angular deviations in azimuth and elevation respectively between the target symbol and the line of sight 9, a recording of the complete target tracking process is obtained, which can be used for later analysis of the performance of the pupil. The recorder 28 may also be designed to indicate on the graph or typed data list predetermined particularly important instants during the target tracking operations, as for instance the instant when the sight operator indicates, for instance by depression of a fire button, that a projectile could be fired at the target being tracked. If the target tracking is to be continued also after the firing of a projectile for the guidance of the projectile towards the target, the recorder 28 may be designed to indicate on the graph being produced also the instant when the fired projectile would have passed the target in the real case.

The cathode ray tube 23 for the training instructor, the recorder 28, the target course generator 19 and the two symbol generators 14 and 27 with their interconnecting circuits including the signal adding circuits 15, 16, 17, 18, 25 and 26, as well as the power supply units (not shown in the drawing) for said circuits and for the cathode ray tubes 10 are preferably concentrated to a unit, which is separate from the sight 1 as such and can be positioned beside the sight and connected thereto through a cable. The signal generators 21 and 22 can for instance consist of direct voltage potentiometers, but it is of course also possible to use other types of signal generators which are capable of sensing the movements of the line of sight 9 in azimuth and elevation respectively, and to produce signals representing said movements. Thus, it is often possible and preferable to use those signal generators that are normally provided on a sight for transmitting information about the direction of the sight line to a weapon or fire control computer associated with the sight.

FIGS. 2 and 3 show by way of example an embodiment of a simulator device according to the invention together with a more sophisticate optical sight, which has a gyrostabilized line of sight, which the sight operator can aim by means of electric servo circuits but which for the rough-aiming during the target catching phase and the first part of the target tracking phase can be locked in a fixed position relative to the sight casing and during these phases be aimed by rotation of the sight casing as such in azimuth and elevation respectively. This aiming sight includes in addition to a sighting telescope also a dioptic, which has a larger field of view than the sighting telescope and which can be used by the sight operator during the target catching phase and the first part of the target tracking phase until the line of sight has been brought close enough to the target for this to become visible through the sighting telescope.

In this connection it should be noticed that FIG. 3 shows only the electric circuits for the azimuth system of the sight and the simulator device, as the elevation system is designed in exactly the same way as the azimuth system.

The aiming sight illustrated in FIGS. 2 and 3 is fundamentally of the same type as the aiming sight described in detail in our copending application "Target Tracking Sight" Ser. No. 119,208, which is filed on the same date as the present application. Therefore, reference is made to said copending application for a more detailed description of the structure and operation of the sight as such. In the present specification only a short review of the structure and operation of the sight will be given.

The sight as such includes a sight casing 28, which is mounted on a schematically indicated stand 29 so as to be rotateable in elevation as well as azimuth. The front wall of the sight casing is provided with a sight opening or viewing window 30. A telescope optics including in conventional manner an objective 31, a prism 32 and an eye piece 33, has a fixed mounting in the sight casing. In front of the eye piece a hairline cross 34 or similar device is mounted, which the sight operator can use for determining the deviation between the line of sight of the telescope and a target seen in the field of view of the telescope. Between the objective 31 and the viewing window 30 an oblique mirror 35 is mounted, which deflects the line of sight of the telescope optics out through the viewing window 30. Consequently, the direction of the exit sight line 36 is determined by the mirror 35, which is universally pivoted in the sight casing, whereby the direction of the sight line 36 can be moved in azimuth as well as elevation.

For the gyro-stabilization and the control of the mirror 35 and thus of the exit sight line 36 a gyro-platform 39 is provided, which is pivoted in a gimbal 37 about an axis 40, which is parallel to the pivot axis H of the mirror 35. The gyro-platform 39 carries two angular velocity responsive gyros $G_s$ and $G_h$, the gyro $G_s$ being responsive to the angular velocity of the gyro-platform 39 about the axis S, whereas the gyro $G_h$ is responsive to the angular velocity of the gyro-platform about its axis 40. The gyros produce signals proportional to said angular velocities. A servomotor $M_h$ mounted on the gimbal 37 is coupled to the axis 40 of the gyro-platform 39, whereas a servomotor $M_s$ mounted on the sight casing 28 is coupled to the axis S of the gimbal 37. The output signal of the gyro $G_s$ is applied as a negative feedback to the servomotor $M_s$, whereas the output signal of the gyro $G_h$ is applied as a negative feedback to the servomotor $M_h$. In this way, as well known in the art, the gyro-platform 39 is automatically stabilized in the space so as to be independent of the movements of the sight casing 28. The gyro-platform 39 is coupled to the mirror 35 through the gimbal 37 and also through a mechanical linkage, which includes a rigid rod 41, which has its one end attached to the rear side of the gyro-platform, and a rigid rod 42, which has its one end attached to the rear side of the mirror 35. The opposite end of the rod 41 is provided with a pin 41a which is displaceable in the fork-shaped end 42a of the rod 42. The effective length of the rod 41 between the pivot center of the gyro-platform 32 and the pin 41a is equal to the distance between the pivot center of the gyro-platform 39 and the pivot center of the mirror 35. The mechanical connection between the gyro-platform 39 and the mirror 35 through the gimbal 37 and the rods 41 and 42 causes that any rotation of the gyro-platform 39 about its axis S or its axis 40 causes an exactly equally large angular rotation of the exit sight line 36 about the axis S or the axis H, respectively. Due to the stabilization of the gyro-platform 39 also the direction of the exit sight line 36 will be stabilized and independent of any movements of the sight casing 28.

The sight operator can move the sight line 36 in azimuth and elevation relative to the ambient space by means of a control lever or joystick 43 mounted on the lower side of the sight casing 28. The control lever 43 is universally pivoted and coupled to two signal generators $S_s$ and $S_h$ which generate signals corresponding to the displacement of the control lever 43 into mutually orthogonal directions. The output signals from the signal generators $S_s$ and $S_h$ can be applied as control signals to the servomotors $M_s$ and $M_h$, respectively, whereby consequently the attitude of the gyro-platform 39 and thus the direction of the sight line 36 in space can be changed in azimuth as well as elevation by actuation of the control lever 43. During this mode of operation of the sight the switches K1 and K2 in the azimuth system shown in FIG. 3 and corresponding switches in the similar elevation system of the sight (not shown) are in the positions opposite to those shown in FIG. 3.

However, the mode of operation of the sight described above with a gyro-stabilized sight line 36, which is controlled by the sight operator by means of the control lever 43 and the servocircuits just described, is used only for the precision-aiming during the accurate target tracking phase. For the rough-aiming during the target catching phase and the first part of the target tracking phase the sight line 36 is instead locked in a fixed position relative to the sight casing 28 and is aimed towards the target by rotation of the entire sight casing 28 in azimuth and elevation respectively in the same manner as for the sight shown in FIG. 1 and described in the foregoing. A handle 44 is mounted on the lower side of the sight casing 28 for this operation.

For the necessary locking of the gyro-platform 39 and thus the mirror 35 and the sight line 36 in a fixed position relative to the sight casing 28 an electric signal generator $P_s$ is provided, for instance consisting of a potentiometer, which is coupled to the axis S of the gimbal 37 and produces a signal representing the angular position of the gimbal and thus of the sight line 36 about the axis S relative to the sight casing 28, and a second similar signal generator $P_h$, which is coupled to the axis 40 of the gyro-platform 39 and produces a signal representing the angular position of the gyro-platform and thus of the sight line 36 in elevation relative to the sight casing 28. For the locking of the gyro-platform 39 and thus the sight line 36 relative to the sight casing 28 the output signals from said signal generators $P_s$ and $P_h$ are applied as control signals to the servomotors $M_s$ and $M_h$, respectively. Consequently, when the sight line 36 is locked to the sight casing, the switches K1 and K2 in the azimuth system shown in FIG. 3 and the corresponding switches in the similar elevation system (not shown) are in the positions shown in FIG. 3.

The object of the additional units in the azimuth system of the sight shown in FIG. 3, namely the amplifiers F1, F2 and F3 with its negative feedback loop and the capacitor C, are described more in detail in the copending application mentioned in the foregoing.

During the target catching phase and the first part of the target tracking phase, during which the sight line 36 is locked in a fixed position relative to the sight casing 28 and is aimed by means of rotation of the complete sight casing 28, it is preferable if the sight operator has a larger field of view than that provided through the telescope optics 31, 32, 33 of the sight. For this purpose a dioptic 45 is mounted on the upper side of the sight casing 28 so as to have its line of sight 46 parallel to the exit sight line 36 of the telescope optics, when the latter sight line is in its locked position relative to the sight casing 28. During the target catching phase and the first part of the target tracking phase, consequently, the sight operator watches the target through the dioptic 45 and aims the sight line 46 of the dioptic and thus also the sight line 36 of the telescope towards the target by rotation of the entire sight casing 28. When the sight lines 46 and 36, respectively, have been moved close enough to the target so that this can be viewed through the telescope 31, 32, 33, the sight operator shifts to view the target through the telescope sight and to aim the sight line 36 of the telescope still more accurately on the target. As soon as the sight line 36 is accurately aimed on the target and the precision target tracking is to be started, the sight operator releases the locking of the sight line 36 by switching the switches K1 and K2 in the azimuth system shown in FIG. 3 and the corresponding switches in the elevation system (not shown) and proceeds to control the now gyro-stabilized sight line 36 by means of the control lever 43.

The target simulator device according to the invention includes a first cathode ray tube 47 having a display screen, which is reflected by means of a simple optics 48 and an oblique, semi-translucent mirror 49 into the field of view of the telescope sight 31, 32, 33. The simulator comprises also a second cathode ray tube 50 having a display screen which is reflected through a simple optics 51 and an oblique, semi-translucent mirror 52 into the field of view of the dioptic 45. The cathode ray tube 47 has deflection plates 47x and 47y, respectively, for deflecting the electron beam in the X-direction and the Y-direction, respectively, over the display screen of the tube. The display screen is reflected into the ray path of the telescope sight 31, 32, 33 in such a way that the center of the screen coincides with the sight line 36 and the X-direction and the Y-direction on the screen coincide with the horizontal direction and the vertical direction, respectively, in the field of view of the telescope sight. In similar manner the cathode ray tube 50 is provided with deflection plates 50x and 50y for deflecting the electron beam in the X-direction and the Y-direction, respectively, over the display screen of the tube. The display screen is reflected into the field of view of the dioptic 45 in such a manner that the center of the screen coincides with the sight line 46 of the dioptic and the X- and Y-directions on the screen coincide with the horizontal direction and the vertical direction, respectively, in the field of view of the dioptic.

It is appreciated that, when the mirror 35 is rotated about its axis S for moving the gyro-stabilized and servo-controlled sight line 36 in azimuth, the field of view through the telescope sight 31, 32, 33 will be rotated about the optical axis of the fixed optical system 31, 32, 33, whereby the real horizontal and vertical directions in the field of view will no longer coincide with but will be tilted relative to the lines of the hariline cross 34 which normally indicate the horizontal and vertical directions, respectively, within the field of view of the sight. Consequently, in order to maintain the X-direction and the Y-direction on the display screen of the cathode ray tube 47, which is reflected into the field of view of the telescope sight 31, 32, 33, coinciding with the real horizontal and vertical directions, respectively, within the field of view of the telescope sight, the cathode ray tube 47 must be rotated through a corresponding angle about its longitudinal axis. For this purpose the cathode ray tube 47 is mounted in hairline sight casing 28 so as to be rotatable about its longitudinal axis, as schematically indicated in FIG. 2. The cathode ray tube 47 is rotated by a servomotor $M_k$, which is coupled to the cathode ray tube 47 through a gear wheel 66 mounted on the shaft of the servomotor and a gear rim 67 mounted on the cathode ray tube 47 so as to rotate the cathode ray tube about its longitudinal axis. The servomotor $M_k$ is also mechanically coupled to a signal generator $P_k$, for instance consisting of a potentiometer, which produces a signal representing the rotation angle of the servomotor $M_k$ and thus of the cathode ray tube 47 relative to the sight casing 28 from a neutral position for the cathode ray tube. As illustrated in FIG. 3, the servomotor $M_k$ receives its control signal through an amplifier F4 from a signal adding circuit 68, which receives on the one hand the output signal from the signal generator $P_s$ and on the other hand as a negative feedback the output signal from the signal generator $P_k$. Consequently, it is appreciated that the servomotor $M_k$ will rotate the cathode ray tube 47 about its longitudinal axis through an angle exactly corresponding to the angle through which the servomotor $M_s$ rotates the mirror 35 about the axis S.

As FIG. 3 illustrates for the azimuth system of the simulator device, which is designed in exactly the same way as the elevation system of the simulator device, the two cathode ray tubes 47 and 50 are, in the same manner as described in connection with FIG. 1, provided with symbol generators 53 and 54, respectively, which produce necessary alternating voltages for the generation of a target symbol on the display screen of the associated cathode ray tube, these alternating voltages being applied to the deflection plates 47x and 50x, respectively, of the cathode ray tubes. These target symbols are moved over the display screens of the cathode ray tubes in accordance with a predetermined desired movement of the simulated target by means of deflection voltages from a target course generator 57, the output signal of which is applied to the deflection plates 47x and 50x, respectively, of the cathode ray tubes through a signal adding circuit 58 and signal adding circuits 55 and 56, respectively. The target course generator 57 controls also the symbol generators 53 and 54 for variation of the size of the generated symbol as a function of the instantaneous distance of the simulated target from the sight. The displacement of the target symbols on the display screens of the cathode ray tubes 47 and 50 as a function of the movements of the sight line 36 in space during the target catching and tracking process is achieved in that the signal from the angular velocity responsive gyro $G_s$ is supplied to the deflection plates 47x and 50x, respectively, of the cathode ray tubes 47 and 50, respectively, through a signal adding circuit 59 and the signal adding circuits 58 and 55 and 56, respectively. As explained in the foregoing the signal from the gyro $G_s$ is proportional to the angular velocity of the sight line 36 in azimuth both when the sight line 36 is locked relative to the sight casing 28 as well as when it is gyro-stabilized and controlled by means of the control lever 43, and consequently it is also proportional to the azimuth angular velocity of the sight line 46 of the dioptic 45 when the sight line 36 of the telescope sight is locked relative to the sight casing 28, wherefore the output signal from the signal integrating circuit 59 will at any moment represent the angular rotation in azimuth of the sight line being used. This signal is supplied to the deflection plates 47x and 50x, respectively, of the cathode ray tubes with such a "polarity" that any movement in azimuth of the sight line being used causes a corresponding but exactly opposite movement of the target symbols in the X-direction on the display screens of the cathode ray tubes 47 and 50, respectively. As illustrated in FIG 3, the deflection plate 47x of the cathode ray tube 47 receives the deflection voltage through a direct voltage amplifier 60, which has an amplification factor corresponding to the difference in magnification factor between the telescope sight 31, 32, 33 on the one hand and the dioptic 45 on the other hand. Consequently, the target symbol will not appear on the display screen on the cathode ray tube 47 associated with the telescope sight until the sight line 36 of the telescope sight has been moved during the target catching phase by the use of the dioptic 45 so close to the simulated target that this would in the real case be visible through the telescope sight 31, 32, 33.

It is appreciated that for the elevation system of the simulator device (not shown in the drawing) the signal from the angular velocity responsive gyro $G_h$ is used in the same way as the signal from the gyro $G_s$ in the azimuth system illustrated in FIG. 3.

FIG. 3 shows also the instructor's cathode ray tube 61, the deflection plate 61x of which receives on the one hand the output signal from the symbol generator 63 of the tube through a signal adding circuit 62 and on the other hand the deflection voltage from the signal adding circuit 58. These deflection voltages are preferably supplied to the cathode ray tube 61 through an amplifier 64 with a manually variable amplification factor, which the instructor can use for selecting the amplification factor of the presentation on the display screen of the cathode tube 61 that he finds suitable for supervising the target tracking operation of the pupil.

FIG. 3 shows also a recorder 65 for recording the amplitude of the deflection voltage from the adding circuit 58 as a function of time. In this embodiment of the invention this recorder 65 may be designed to indicate automatically on the recorded graph the instant when the sight operator changes from using the dioptic 45 to using the telescope sight 31, 32, 33, the instant when the sight operator releases the locking of the gyro-platform 39 and proceeds to track the target with a gyro-stabilized sight line 36 controlled by means of the control lever 43, the instant when a projectile is fired against the target being tracked and, if the fired projectile is to be guided towards the target by means of the sight, also the instant when the fired projectile passes the target.

It is appreciated that within the frame of the invention considerable modifications of the structural details of the simulator device are possible dependent on the type and operation of the sight for which the simulator device is to be used. Thus, for instance a common symbol generator may be used for all cathode ray tubes in the simulator. Further, in an embodiment of the type illustrated in FIGS. 2 and 3 the target course generator 57 may for instance be designed to produce signals representing the angular velocities in azimuth and elevation of the simulated target, in which case these signals are added directly to the signals from the angular velocity responsive gyros of the sight and subsequently integrated.

I claims:

1. A target simulator for an optical aiming sight for simulating a moving target for training purposes, comprising a cathode ray tube (10) with a display screen (13), means (14) for generating a luminous, target simulating symbol on said display screen and deflection means (10x, 10y) for moving said target symbol relative to a center on said display screen as a function of signals supplied to said deflection means; target course generating means (19) for generating a signal varying in a predetermined manner, which is applied to said deflection means, whereby said target symbol is moved over the display screen of said cathode ray tube in a predetermined manner corresponding to the predetermined movements of the target to be simulated; means (12) for reflecting an image of said display screen of said cathode ray tube into the field of view of said aiming sight with said center point of said display screen coinciding with the line of sight (9) of said aiming sight; and means (21, 22) responsive to the movements of said line of sight relative to a coordinate system fixed in space for generating a signal representing said movements, said signal being supplied to said deflection means of said cathode ray tube as an additional control signal therefore in such a manner that any movement of said line of sight relative to space causes a corresponding but exactly oppositely directed movement of said target symbol on said display screen relative to the center of the display screen.

2. A target simulator as claimed in claim 1, further comprising a second cathode ray tube (23) with a display screen (24), means (27) for generating a luminous symbol on said display screen and deflection means (23x, 23y) for moving said symbol relative to a center on said display screen as a function of signals supplied to said deflection means, said deflection means of said second cathode ray tube being supplied with the same signals as said deflection means (10x, 10y) of said first cathode ray tube (10), whereby the symbol on the display screen of said second cathode ray tube is moved in accordance with the movements of the target symbol on the display screen of said first cathode ray tube, said second cathode ray tube being located so that its display screen can be viewed by a training instructor.

3. A target simulator as claimed in claim 1 further comprising signal recording means (28) for recording the amplitude of the total signal supplied to said deflection means (10x, 10y) of said cathode ray tube (10) as a function of time.

4. A target simulator as claimed in claim 1, wherein said symbol generating means (14) for said cathode ray tube (10) is controlled by said target course generating means (19) so as to vary the size of said target symbol in accordance with the instantaneous range to a target moving in the target course determined by said target course generator.

5. A target simulator as claimed in claim 1, wherein said deflection means of said cathode ray tube (10) include X-deflection means (10x) for moving said target symbol in the X-direction on the display screen (13) of the tube and Y-deflection means (10y) for deflecting said target symbol in the Y-direction on the display screen, the image of said display screen being reflected into the field of view of the aiming sight in such a manner that the X-direction on the display screen coincides with the horizontal direction in said field of view and the Y-direction on the display screen coincides with the vertical direction in said field of view, sad target course generating means (19) generating a first signal component representing the movements of the simulated target in azimuth, said first signal component being supplied to said X-deflection means (10x) of said cathode ray tube, and a second signal component representing the movements of the simulated target in elevation in said predetermined target course, said second signal component being supplied to said Y-deflection means (10y) of said cathode ray tube, and said means (21, 22) responsive to the movements of said line of sight (9) generating two signals proportional to the movements of said line of sight in azimuth and elevation respectively and said two signals being supplied to said X-deflection means and said Y-deflection means respectively of said cathode ray tube.

6. A target simulator as claimed in claim 5, wherein said means responsive to the movements of said line of sight (36) include two angular velocity responsive gyros ($G_s$, $G_h$) mounted in said aiming sight so as to be responsive to the angular velocity in azimuth and the angular velocity in elevation respectively of said line of sight and to produce signals proportional to said angular velocities and signal integrating means (59) for integrating said signals.

* * * * *